June 17, 1952     E. S. GANDRUD     2,600,865
LAND MEASURING INSTRUMENT
Filed Sept. 22, 1950     2 SHEETS—SHEET 1
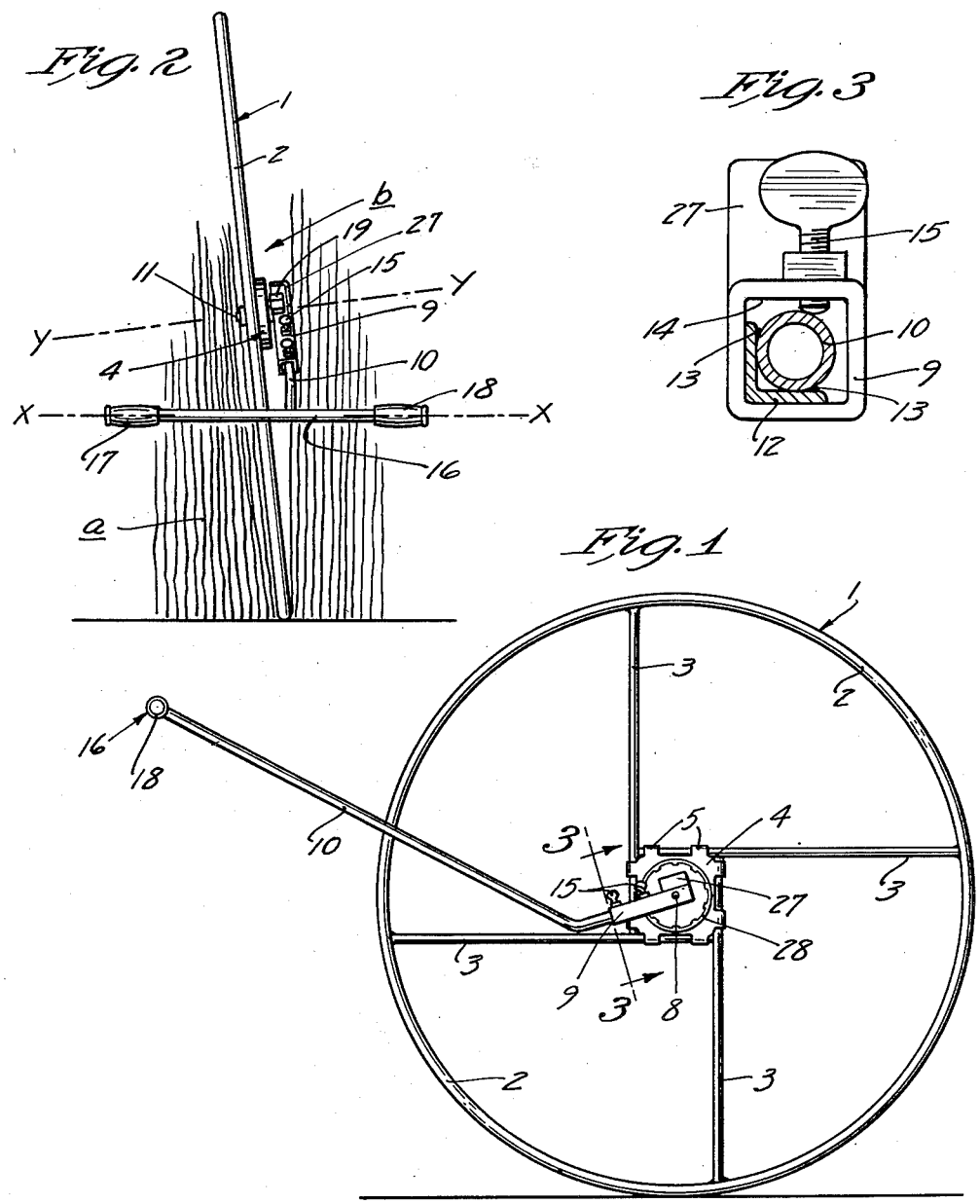
Inventor
Ebenhard S. Gandrud
By his Attorneys
Merchant & Merchant June 17, 1952 E. S. GANDRUD 2,600,865
LAND MEASURING INSTRUMENT
Filed Sept. 22, 1950 2 SHEETS—SHEET 2
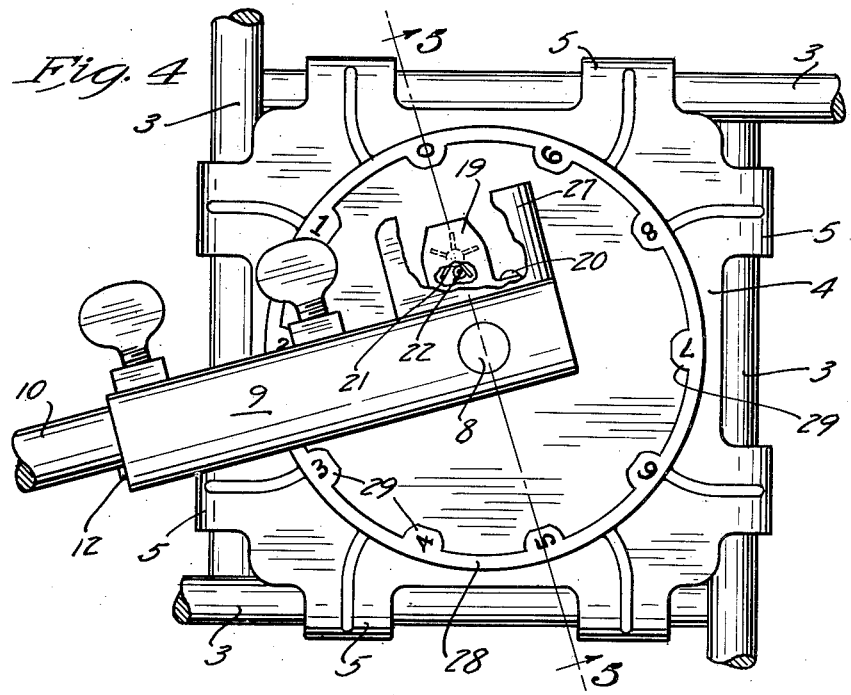
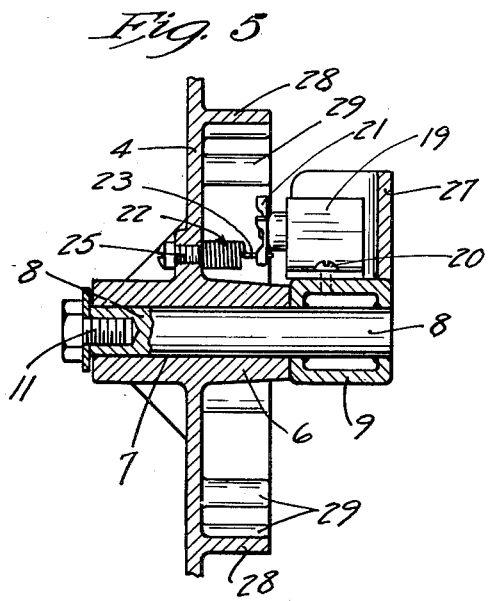
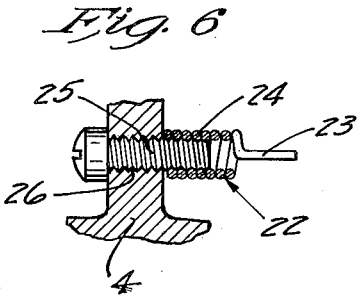
Inventor
Ebenhard S. Gandrud
By his Attorneys
Merchant & Merchant Patented June 17, 1952

2,600,865

UNITED STATES PATENT OFFICE 2,600,865

LAND MEASURING INSTRUMENT

Ebenhard S. Gandrud, Owatonna, Minn.

Application September 22, 1950, Serial No. 186,161

5 Claims. (Cl. 33—141)

My present invention relates generally to improvements in devices for use in mensuration and more specifically to a device for accurately measuring land areas and the like. More particularly, my invention is in the nature of an improvement of the structure disclosed in my prior U. S. Letters Patent No. 2,121,867, issued June 28, 1938.

In the utilization of the measuring wheels of the type disclosed in my prior patent, above identified, it is sometimes necessary that the measuring wheels be operated in tall grasses, brush, or the like. As a consequence, leaves, grass, or the like frequently catch in the wheel revolution counter mechanism and interfere with the accuracy thereof. Moreover, if the growth is particularly dense, there is a danger of injury to the counter mechanism if an excessive amount of vegetation is entangled therein. A highly important object of my invention is, therefore, the provision of a measuring wheel, which, when used in ripening grain fields or in tall grass, can automatically part the blades or stems in its path so that contact between the revolution counter mechanism and the surrounding growth is effectively prevented.

Another object of my invention is the provision of a land measuring wheel of the type set forth having spaced hand grips for impelling and guiding the same over the ground, said wheel being arranged to be disposed at an oblique angle with respect to the ground when the hand grips are at a substantially common level, whereby to effectively part tall grass or stems of tall vegetation thus obviating the necessity for large cumbersome guard means.

Still another object of my invention is the provision of a novel arrangement of handle means whereby a wheel of the above type is nicely balanced when in a tilted operative position.

A still further object of my invention is the provision of means in a wheel as set forth for determining the amount of lineal travel of the wheel during a fractional portion of a single revolution thereof over the ground.

Another object of my invention is the provision of novel actuator means for the wheel revolution counter mechanism whereby the portion of the actuator which normally engages a star wheel on the counter will be moved laterally out of its normal path of travel by any foreign matter which may, under some conditions such as misuse of the device by the operator, find access to the counter mechanism. To this end, I provide an actuator in the nature of a striker pin yieldingly biased toward its normal operative position and adapted to be moved out of its normal path of travel against said bias when undue lateral pressure is exerted thereagainst.

The above and other highly important objects and advantages of my invention will become apparent from the following detailed specification, appended claims, and attached drawings.

Referring to the drawings which illustrate the invention and in which like characters indicate like parts throughout the several views:

Fig. 1 is a view in side elevation of my improved measuring wheel structure;

Fig. 2 is an end elevation as seen from the left to the right with respect to Fig. 1, but showing a different position of some of the parts, and illustrating the normal operative position of the measuring wheel;

Fig. 3 is an enlarged fragmentary detail partly in section and partly in elevation taken on the line 3—3 of Fig. 1;

Fig. 4 is an enlarged fragmentary view in side elevation of the hub structure of my improved measuring wheel, some parts being broken away;

Fig. 5 is a fragmentary section taken substantially on the line 5—5 of Fig. 4; and Fig. 6 is a still further enlarged fragmentary detail of the hub structure illustrating an improved revolution counter actuator of my invention.

Referring with greater detail to the drawings, the numeral 1 indicates in its entirety a land measuring wheel comprising an annular rim 2, a plurality of spokes or the like 3, and a hub 4. The rim 2 and spokes 3 are preferably made from tubular steel or the like, the spokes 3 being rigidly secured at their outer ends to spaced inner circumferential portions of the rim 2 by welding or the like. At their inner ends, the spokes 3 extend through lugs 5 on the hub 4 where they are rigidly secured by suitable means. The wheel 1 may be constructed in any suitable size but preferably is produced with an outer circumference measuring ten feet (10').

The hub 44 is integrally formed with an axially extended central bearing boss 6 which is axially bored as indicated at 7 to receive a stub shaft 8. One end of the shaft 8 is welded or otherwise rigidly secured to an elongated shank mounting head 9 which comprises a portion of an elongated shank 10 as will hereinafter become apparent. The wheel 1, being journalled for free rotation on the shaft 8 is positively limited against axial movements with respect to the shaft 8 in one direction by engagement of one end of the bearing boss 6 with the shank head 9 and in the other direction by a washer-equipped bolt or the like 11, screw threaded into the free end of the shaft 8, see particularly Fig. 5.

The shank 10 is preferably made from tubular material and at one end is provided with a relatively short length of angle iron or the like 12 extending longitudinally thereof and welded or otherwise secured thereto as indicated at 13. With reference to Fig. 3, it will be seen that the shank head 9 is provided with a generally rectangular longitudinally extended aperture 14 which is adapted to receive the angle iron equipped end of the shank 10. A pair of thumb screws or the like 15 are utilized to clamp the angle iron 12 and the adjacent end of the shank 10 within the shank head 9 against longitudinal or turning movements with respect thereto. At its opposite free end, the shank 10 is formed to provide a transversely extending handle bar 16 which terminates at its opposite ends in hand grips or the like 17 and 18 preferably made from rubber-like material, whereby the operator may maintain a firm hold thereon. The shank head 9, the shank 10, and the hand grip equipped handle bar 16 comprise wheel guiding and impelling means for the wheel 1, whereby said wheel may be moved through a field to be measured.

Means for indicating the number of feet traveled by the wheel 1 during movement over a given field comprises conventional wheel revolution counter mechanism, not shown but contained within a casing 19 hereinafter to be referred to as the counter. The counter 19 is anchored to the shank head 9 by means of screws or the like 20 and is equipped with a star wheel 21 that lies in the normal path of travel of an actuator 22. Said actuator 22 may be of any suitable type, but preferably and as shown, comprises a striker pin 23 formed from a length of resilient wire, the greater portion of which is helically wound to provide a coil spring 24 which is screw threaded on the projected end of a stud or bolt 25 that is in turn screw threaded through a threaded hole 26 in the hub 4 and projects therethrough in the direction of the star wheel 21. A guard plate or the like 27 is bolted or otherwise rigidly secured to the front end of the shank head 9 and extends around the front, side, and outer end of the counter 19, whereby to protect the same against possible damage during inoperative periods of the measuring wheel.

With reference to Fig. 2, it will be noted, when the shank 10 is coupled to the shank head 9, the handle bar 16 is disposed at an angle to the axis of the wheel 1. In other words, a plane extending through the midpoints of the hand grip portions 17 and 18 indicated by the broken line $x$—$x$, and through the center of the wheel 1, the axis of which is indicated by broken line $y$—$y$, will be angularly disposed with respect to the axis $y$—$y$. Thus, when the handle bar 16 is held in a normal wheel impelling position with the hand grips 17 and 18 at a substantially common level, the plane of the wheel will be disposed at an oblique angle to the vertical. Obviously, when the plane of the wheel is thus disposed, it will also be disposed at an oblique angle to the ground, assuming that the ground is fairly level. With this arrangement, the wheel will tend to part the stems or blades of tall vegetation indicated by $a$ in Fig. 2, thus providing a cleared space or opening $b$ for the unhindered passage of the counter mechanism. As shown in Fig. 2, the shank and counter are disposed on the uppermost side of the wheel 1 in its normal operative position. I have found that by thus tilting the wheel, that a field of tall vegetation may be readily traversed without danger of leaves, grain, or blades of grass becoming entangled in the counter mechanism.

It will be further noted with reference to Fig. 2, that the hand grips 17 and 18 are unequally spaced from the adjacent end of the shank 10, but that they are substantially equally spaced from the plane of the wheel 1. This particular arrangement of the hand grips 17 and 18 permits an equal distribution of pressure to be applied to each hand grip to maintain the wheel 1 in proper balance in its tilted condition and enables the operator to control the wheel without appreciable effort for extended periods of time.

As sometimes occurs, the star wheel 21 may become accidentally jarred or moved so that the striker pin or finger 23 engages the extreme end of one of the points of the star wheel instead of the side surface thereof. With the use of a conventionally rigid actuator finger, said actuator finger may be bent or broken under the impact thereof with the extreme end of one of the points of the star wheel 21, or the star wheel itself or the counter mechanism may be injured sufficiently to render the same inoperative. With the use of my improved flexible resilient actuator means, any undue lateral pressure upon the striker pin 23 will cause the same to be moved out of its normal path of travel until the obstruction is passed, whereupon the finger 23 will return to its operative position without any damage being done thereto or to the counter mechanism. The normal resilience of the striker pin or finger 23 is further enhanced by the resilience of the coil portion 24 axially outwardly of the projected end of the stud 25.

As the measuring wheel 1 is rotatively moved through a field, the striker pin 23 engages the star wheel 21 to register thereon each full revolution of the wheel thereby indicating that the wheel has traveled a distance of ten feet (10') for each revolution, assuming the circumference of the wheel is ten feet (10'). For indicating the distance traveled by the wheel 1 during a rotary movement less than a full revolution, I provide an annular flange 28 integrally formed with the hub 4 and projecting axially in the direction of the counter 19. The flange 28 is provided with a plurality, as shown 10, of circumferentially spaced radially inwardly projecting ears or the like 29 which, on their outer faces, contain indicia denoting lineal distance traveled by the measuring wheel 1 during a fractional portion of a full revolution thereof. In utilizing the indicia on the ears 29 to denote such fractional distances traveled, the counter 19 provides an index whereby the reading may be taken, the indicia on the ear 29 overlying the counter 19 indicating the unit to be read. Thus, the counter 19 will register the distance traveled in increments of ten feet (10') whereas the numbered ears 29 will register the distance traveled during a fractional part of a full rotation in increments of one foot (1'). From the above it should be obvious that a quick reading on both the counter 19 and the numbered ears 29 may be readily taken.

My improved measuring wheel may be dismantled for transport or storage by merely loosening the thumb nuts 15 and removing the handle equipped shank 10 from the shank head 9 thereby enabling the user to store the same in a relatively narrow space.

My invention has been thoroughly tested and found to be completely satisfactory for the accomplishment of the objectives set forth; and, while I have shown and described a preferred embodiment of my improved land measuring instrument, it will be understood that the same is capable of considerable modification without departure from the spirit and scope of the invention as defined in the claims.

What I claim is:

1. A land-measuring instrument comprising a ground-engaging measuring wheel, wheel guiding and impelling means including a shank portion and laterally spaced hand grip portions, means journalling said wheel to said shank portion for free rotation with respect thereto about an axis extending transversely thereof, and a counter mechanism and a cooperating counter actuator one operatively associated with said wheel and one with said shank, said hand grip portions being so disposed with respect to the axis of rotation of said wheel that a plane extending through the midpoints of said hand grip portions and the center of said wheel will be angularly disposed with respect to said wheel axis, whereby, when said shank portion is in its normal position extending generally in the direction of the path of travel of said wheel, with said hand grip portions at a substantially common level, the plane of said wheel will be disposed at an oblique angle to the vertical and said counter mechanism will be situated adjacent the uppermost side of said wheel.

2. A land measuring instrument comprising a ground-engaging measuring wheel, wheel guiding and impelling means including a shank portion at one side of said wheel and laterally spaced hand grip portions radially outwardly of the periphery of said wheel, means journalling said wheel to said shank portion for free rotation with respect thereto about an axis extending transversely thereof, a star wheel equipped counter operatively associated with the shank portion and a cooperating striker mounted on said wheel, said hand grip portions being so disposed that a plane extending through the midpoints of said hand grip portions and the center of said wheel will be angularly disposed with respect to said wheel axis, whereby when said shank portion is in its normal position extending generally in the direction of the path of travel of said wheel with said hand grip portions at a substantially common level, the plane of said wheel will be disposed at an oblique angle to the vertical and said counter mechanism will be situated adjacent the uppermost side of said wheel.

3. A land measuring instrument comprising a ground-engaging measuring wheel, a hub on said wheel, a shank-mounting head, means journalling the wheel to said head for free rotation with respect thereto, a star wheel equipped counter mechanism mounted on said head, a cooperating striker mounted on said wheel, wheel guiding and impelling means including a shank portion and laterally spaced hand grip portions, said shank portion being adapted to be removably secured to the head, said hand grip portions being so disposed with respect to the axis of rotation of said wheel that a plane extending through the midpoints of said hand grip portions and the center of said wheel will be angularly disposed with respect to said wheel axis, whereby when said shank portion is in its normal position extending generally rearwardly of the direction of travel of said wheel, with the hand grip portions at a substantially common level, the plane of said wheel will be disposed at an oblique angle to the vertical and said counter mechanism will be situated adjacent the uppermost side of said wheel.

4. A land measuring instrument comprising a ground-engaging measuring wheel, a hub on said wheel, a shank-mounting head, counter mechanism comprising a star wheel equipped counter on said head and a cooperating striker mounted on said wheel, wheel guiding and impelling means including a shank and a handle bar rigidly secured at its intermediate portion to said shank at substantially right angles thereto, means releasably securing the inner end of said shank to said head, said handle bar defining a pair of hand grip portions unequally spaced from the outer end of said shank whereby the plane of said wheel will intersect said handle bar at substantially the longitudinal center thereof, said hand grip portions being so disposed with respect to the axis of rotation of said wheel that a plane extending through the midpoints of said hand grip portions and the center of said wheel will be angularly disposed with respect to said wheel axis, whereby when said shank is in its normal position extending generally rearwardly of the path of travel of said wheel with said hand grip portions at a substantially common level, the plane of said wheel will be disposed at an oblique angle to the vertical and said counter mechanism will be situated adjacent the uppermost side of said wheel.

5. The structure defined in claim 1 in which said actuator comprises a striker pin extending in a direction to engage a portion of said counter mechanism, and in further combination with yielding means tending to maintain said striker pin in its operative counter actuating position.

EBENHARD S. GANDRUD.

REFERENCES CITED

The following references are of record in the file of this patent:

UNITED STATES PATENTS

| Number | Name | Date |
| --- | --- | --- |
| 2,085,247 | Bible | June 29, 1937 |
| 2,121,867 | Gandrud | June 28, 1938 |
| 2,123,360 | Harris | July 12, 1938 |
| 2,143,997 | Parkinson | Jan. 17, 1939 |

FOREIGN PATENTS

| Number | Country | Date |
| --- | --- | --- |
| 311 | Italy | Sept. 9, 1867 |